Jan. 29, 1957

H. W. STEINIGER 2,779,638

THRUST BEARING AND SEAL

Filed Aug. 22, 1952

INVENTOR.
Herman W. Steiniger
BY
Tom Walker

United States Patent Office 2,779,638
Patented Jan. 29, 1957

2,779,638

THRUST BEARING AND SEAL

Herman W. Steiniger, Springfield, Ohio, assignor to The Bauer Bros. Company, Springfield, Ohio, a corporation of Ohio Application August 22, 1952, Serial No. 305,729

15 Claims. (Cl. 308—187)

This invention relates to a thrust bearing and seal combination. While not so limited, it has especial reference to pulp mills and refiners. In such devices, grinding plates are arranged in opposing relation and pulp material fed therebetween. The plates are relatively rotated and the pulp material is reduced or refined by a process of grinding or attrition. The shafts upon which the plates are mounted are, by reason of the work performed, subject to radial and axial thrusts of large and varying intensity.

The object of the invention is to improve the construction as well as the means and mode of operation of thrust bearings and seals therefor, whereby they may not only be economically manufactured, but will be more efficient in use, automatic in operation, uniform in action, having relatively few parts, and be unlikely to get out of repair.

The instant invention has as one important object, the production of an improved bearing construction for shafts in an installation as described.

Another object of the invention is to present a generally new thrust bearing offering but little frictional resistance to rotary motion, and obviating the use of mechanical rolling bearings and the like.

A further object of the invention is to utilize a body of confined hydraulic fluid as a thrust bearing.

Still another object of the invention is to present a generally new ring seal of particular utility in connection with a hydraulic thrust bearing as defined.

A still further object of the invention is to present a centrifugally influenced ring seal on a rotating piston.

Still another object of the invention is to present a centrifugally responsive ring seal made up of a plurality of disconnected arcuate segments, the ends of which interfit with the ends of adjacent segments.

A further object of the invention is to provide a thrust bearing and seal therefor possessing the advantageous structural features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is illustrated the preferred but obviously not necessarily the only form of embodiment of the invention, Fig. 1 is a view in longitudinal section of a combination bearing and seal assembly in accordance with the illustrated embodiment of the invention;

Like parts are indicated by similar characters of reference throughout the several views.

Figure 1:
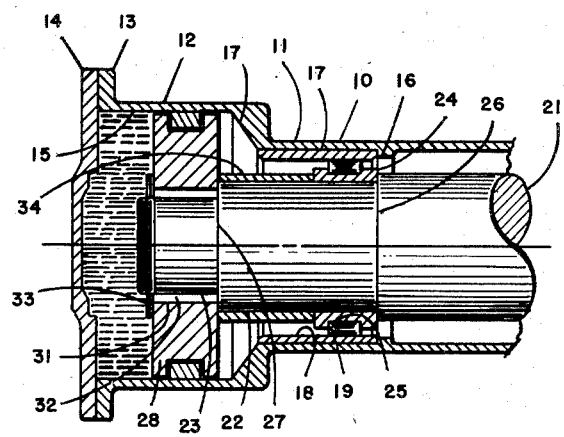
Figure 2:
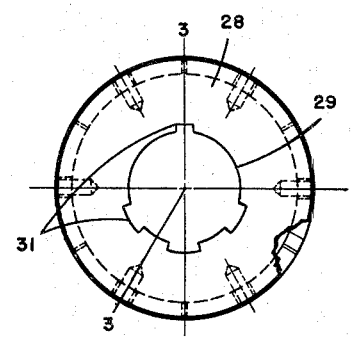
Fig. 2 is a view of the piston assembly in front elevation.
Figure 3:
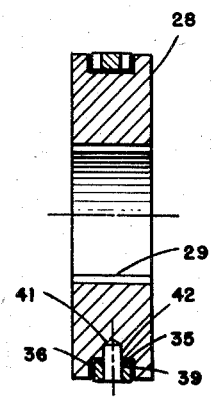
Fig 3 is a view in cross section taken substantially along the lines 3—3 of Fig. 2.

Referring to the drawings, a combination thrust bearing and hydraulic piston in accordance with the illustrative embodiment of the invention, is comprised in a housing 10 having a main cylindrical body portion 11 terminating at its one end in an enlarged cylindrical portion 12. At its outer or free end, the cylindrical enlarged portion 12 is formed with a flange 13 to which is bolted a closure plate 14. The interior of portion 12 is smooth bored, defining a hydraulic piston chamber or cylinder 15 closed at one end by the plate 14. The other end of the chamber 15 opens into the main body portion 11 of the housing, which contains a longitudinal bore 16. Within a counterbore 17 in the bore 16 is seated a sleeve 18 representing an outer raceway for a bearing 19 comprised of a series of cylindrical rolling bearings.

The bearing assembly 19 functions as a radial bearing for a shaft 21, one end of which extends into the housing by way of the main body portion 11. The shaft 21 has a reduced diameter portion 22, and, at its extremities, a further reduced projecting portion 23 received in the chamber 15. Slipped over the reduced diameter portion 21 and secured thereto, as by means of a press fit, is a collar 24. The collar 24 serves as the inner raceway for the bearing 19, being formed with a peripheral groove 25 receiving the individual rolling bearings. The radial bearing 19, in cooperation with elements 18 and 24, serves to hold the shaft 21 in concentric position in the bore 16 and to absorb radial thrusts resulting from operation of the shaft, such shaft being essentially a rotating shaft with incidental endwise thrust exerted in a right hand direction or toward the piston chamber 15.

The junction between the main body portion of shaft 21 and reduced diameter portion 22 is represented by a shoulder 26. Similarly, the junction between portion 21 and the further reduced projecting portion 23 is represented by a shoulder 27. The collar 24 is seated upon shoulder 26. Seated upon shoulder 27 is a piston 28 which has a central opening 29 receiving the reduced diameter projecting portion 23. The opening 29 is formed with key slots 31 engaging complementary key formations 32 of the projection 23 in such wise as to lock the piston 28 to the projection 23 for unison rotation with the shaft 21 but to allow the piston 28 axial motion relative to the projection 23 for purposes of assembly and disassembly. The piston 28 normally is locked in place on the shaft 21 by a nut 33 screw threaded on to the outer end of projection 23. The shaft 21 and piston 28 bear a unitary relation to one another, with the piston partaking of all of the movements of the shaft and vice versa.

In this connection, the spaced apart fixed relationship between the piston 28 and the collar 24 is maintained by a spacer sleeve 34 interposed between such members in surrounding relationship to the reduced diameter shaft portion 22. It further will be noted that the shaft assembly including the piston 28, is arranged in the housing 10 for freedom of longitudinal sliding motion as well as rotary motion. The periphery of the piston 28 lies in touching or closely adjacent relationship to the wall of chamber 15 in a manner further to center the shaft assembly in the housing 10.

Through means which it is unnecessary here to consider, hydraulic fluid is introduced into the chamber 15 sufficient to fill or substantially to fill the space between the piston 28 and the closure plate 14. The fluid is confined within this space by the piston 28, and, being substantially incompressible, responds to endwise thrust of the piston shaft combination by exerting a thrust of equal magnitude in the opposite direction. End thrusts of the piston 21 are accordingly absorbed by the hydraulic fluid in the chamber 15 which thus acts as a thrust bearing. The hydraulic fluid allows the piston freely to rotate without interposing any material frictional resistance. It thus obviates the need for any mechanical bearing devices to sustain end thrusts of the shaft 21 while not restricting freedom of rotation thereof.

The piston 28 carries on its periphery a bearing seal for preventing any substantial loss of hydraulic fluid from the chamber 15. The piston has a circumferential groove 35 extending completely about its periphery. The groove 35 receives a ring seal assembly made up of a plurality of arcuate segments 36. In height the segments 36 are slightly less than the depth of the grooves 35. Each segment is formed at its one end with a projecting tongue 37 and at its other end with a groove 38. Each segment is accordingly arranged for interfitting engagement with the adjacent segment. The seal effected by the several segments accordingly is continuous all around the piston and yet the individual segments are independently movable in a radial direction. Each segment further is formed at about its mid point with a radial opening 39. Extending into each opening 39 is a guide stud 41 set in a radial recess 42. The stud recesses 42 are spaced about the periphery of the piston 28 and open into the bottom of the grooves 35.

It will be understood that the bearing seal comprised of segments 36 is subject to centrifugal influence. Thus, in response to rotation of the piston 28 the segments 36 move radially outward into touching, sealing contact with the wall of chamber 13. They effectively deny any material amount of flow of hydraulic fluid around the piston. An oil film will ordinarily establish itself between the seal segments and the wall of the cylinder hence avoiding any great amount of friction.

When the shaft 21 is at rest, there is no pressure being exerted upon the hydraulic fluid in the chamber 15. Thus, there is no force except that of gravity tending to move the fluid around the piston 28. This force effectively is resisted around the lower portion of the piston by the segments 36 which are allowed to drop to a seat on the wall of the cylinder or chamber 15.

Figure 5:
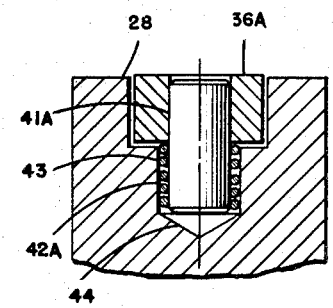
Fig. 5 is a detail view in cross section showing an alternative mounting for the segments of the ring bearing seal.
Figure 4:
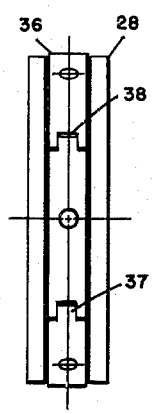
Fig. 4 is a view in side elevation of the segmental bearing seal.

In the event it should be desired that all of the segments 36 should at all times engage the wall of chamber 15, spring means may be incorporated in the device for so urging the sealing segments. As seen in Fig. 5, a segment 36a corresponding to segment 36 may be mounted on a stud 41a corresponding to the stud 41 while a compression spring 43 surrounds the stud 41a and urges the segments 36a continuously outward in a radial direction. According to this construction and arrangement of parts, the stud 41a is mounted in a recess 42a having a counterbore 44 receiving the spring 43.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. In a device of the class described, a shaft arranged for rotary and endwise movements, a relatively fixed generally cylindrical housing receiving through one end thereof one end of said shaft and presenting at the opposite end a piston chamber into which said shaft projects, a piston in said chamber attached to said shaft, rolling means in said housing providing a radial bearing for said shaft, a body of hydraulic fluid confined in said piston chamber by said piston providing a thrust bearing for said shaft, and sealing means providing for limited escape of hydraulic fluid from said body for lubrication purposes.

2. In a device of the class described, a housing presenting a piston chamber and a hollow projecting body portion, a piston mounted in said chamber for freedom of rotary and longitudinal sliding motions, said chamber containing a body of liquid providing a thrust bearing for said piston, a rolling radial bearing in said body portion, a shaft extending into said housing through said body portion and attached to said piston, and spacer means on said shaft maintaining a unitary spaced apart relation between said piston and said radial bearing.

3. A device according to claim 2, characterized by a bearing seal in the periphery of said piston movable out under centrifugal force to contact the wall of said piston chamber during rotation of said piston.

4. In a device of the class described, a relatively stationary housing having a piston chamber, a piston received in said chamber for freedom of rotary and axial movements, and a segmental ring seal peripherally mounted on said piston and centrifugally engaged with the wall of said chamber in response to rotation of said piston, at least one end of said piston chamber containing a body of hydraulic fluid acting as a thrust bearing for said piston.

5. In a device of the class described, a relatively stationary housing having a piston chamber, a piston received in said chamber for freedom of rotary and axial movements, said piston confining a body of hydraulic fluid in one end of said chamber, said fluid acting as a thrust bearing for said piston, and a seal of split construction on the periphery of said piston movable radially under centrifugal force.

6. A device according to claim 5, characterized in that said seal comprises a plurality of arcuate segments, the ends of each segment being in interfitting, disconnected engagement with adjacent segments.

7. A bearing housing for rotary shaft, including a cylindrical body portion, a piston chamber defined in said body portion and presenting relatively open and closed ends, the open end thereof receiving the rotary shaft, a piston mounted in said chamber for freedom of rotary and sliding movements, said piston being attached to the rotary shaft and having a single relatively broad and deep circumferential groove in the periphery thereof, a centrifugally responsive bearing seal in said groove urged uniformly against the internal wall of said piston chamber in response to rotation of said piston, said seal being dimensioned to fit loosely in said groove and a body of a hydraulic fluid confined in said chamber between the piston and closed end of said chamber serving as a thrust bearing for said piston.

8. A bearing housing according to claim 7, characterized by a radial rolling bearing in said housing engaging the shaft in advance of its entrance into said piston chamber, said radial bearing being lubricated by leakage of hydraulic fluid past said bearing seal.

9. In a device of the class described, a relatively stationary housing having a piston chamber, a rotary shaft subject to end thrusts extending into said housing, the inner end of said shaft being received in said piston chamber, a piston in said chamber attached to said shaft, said piston confining a body of hydraulic fluid in one end of said chamber, said fluid acting as a thrust bearing for said piston and shaft, a peripheral recess in said piston, and a centrifugally responsive ring seal in said recess, said seal comprising a plurality of arcuate segments the ends of each of which are in interfitting, disconnected engagement with adjacent segments.

10. A device according to claim 9, characterized by individual guide studs for each seal segment radially disposed with respect to the axis of said piston and set in the periphery of said piston.

11. A device according to claim 9, characterized by spring means urging said seal segments continuously outward into contact with the wall of said piston chamber.

12. In a device of the class described, a relatively stationary housing having a piston chamber, a rotary shaft subject to end thrusts extending into said housing, the inner end of said shaft being received in said piston chamber, a piston in said chamber on said shaft, said piston confining a body of hydraulic fluid in one end of said chamber serving as a thrust bearing, a peripheral recess in said piston, and a gravity and centrifugal responsive ring seal in said recess tending to prevent escape of fluid thereby while said shaft is rotating and to permit limited escape of fluid thereby while said shaft is not rotating.

13. A device according to claim 12, characterized in that said ring seal is made up of arcuate segments freely received in said recess for individual retraction and extension therein.

14. In a device of the class described, a relatively stationary housing having a piston chamber, a rotary shaft subject to end thrusts extending into said housing, the inner end of said shaft being received in said piston chamber, a piston in said chamber on said shaft, said piston confining a body of hydraulic fluid in one end of said chamber serving as a thrust bearing, said fluid having pressure applied thereto by end thrust of said shaft, such pressure being released in response to discontinuing of said end thrust, and sealing means in the periphery of said piston uniformly engaging the wall of said piston chamber under centrifugal force during rotation of said shaft and retracting by gravity eccentrically from portions of said wall when said shaft is not rotating.

15. A device according to claim 14, characterized by a radial rolling bearing in said housing engaging said shaft in advance of its entrance into said piston chamber and lubricated by hydraulic fluid escaping past said sealing means in the retracted position thereof.

References Cited in the file of this patent

UNITED STATES PATENTS

| | | |
|---|---|---|
| 75,868 | Cullen | Mar. 24, 1868 |
| 424,856 | Child | Apr. 1, 1890 |
| 754,400 | Westinghouse | Mar. 8, 1904 |
| 862,208 | Smith | Aug. 6, 1907 |
| 1,834,884 | Wilson | Dec. 1, 1931 |
| 2,434,659 | Kluppel | Jan. 20, 1948 |

FOREIGN PATENTS

| | | |
|---|---|---|
| 12,118 | Great Britain | 1884 |
| 494,433 | Great Britain | Oct. 26, 1938 |
| 769,130 | Canada | Nov. 7, 1950 |